(12) United States Patent
Gaskin et al.

(10) Patent No.: US 11,080,774 B2
(45) Date of Patent: Aug. 3, 2021

(54) ONLINE SYSTEM AND METHOD FOR PERSONALISING A GREETING CARD OR STATIONERY WITH HANDWRITING AND DOODLES USING A COMPUTER

(71) Applicant: Cardly Pty Ltd, South Melbourne (AU)

(72) Inventors: Patrick James Gaskin, South Melbourne (AU); Thomas Clift, Carnegie (AU)

(73) Assignee: CARDLY PTY LTD, South Melbourne (AU)

( * ) Notice: Subject to any disclaimer, the term of this patent is extended or adjusted under 35 U.S.C. 154(b) by 467 days.

(21) Appl. No.: 15/755,030

(22) PCT Filed: Aug. 25, 2016

(86) PCT No.: PCT/AU2016/050787
§ 371 (c)(1),
(2) Date: Feb. 23, 2018

(87) PCT Pub. No.: WO2017/031545
PCT Pub. Date: Mar. 2, 2017

(65) Prior Publication Data
US 2018/0247357 A1 Aug. 30, 2018

(30) Foreign Application Priority Data
Aug. 25, 2015 (AU) ................. 2015903436

(51) Int. Cl.
*G06F 3/0484* (2013.01)
*G06Q 30/06* (2012.01)
(Continued)

(52) U.S. Cl.
CPC ....... *G06Q 30/0621* (2013.01); *G06F 3/0482* (2013.01); *G06F 3/04842* (2013.01);
(Continued)

(58) Field of Classification Search
CPC .............. G06F 3/0482; G06F 3/04842; G06F 3/04845; G06F 3/1206; G06F 3/1242;
(Continued)

(56) References Cited

U.S. PATENT DOCUMENTS 5,108,206 A 4/1992 Yoshida
6,507,865 B1 * 1/2003 Hanson .................. G06Q 10/10
705/36 R
(Continued)

OTHER PUBLICATIONS

Jennifer Farley, Two Quick Illustrator Text Effects, Aug. 18, 2009, all pages (Year: 2009).*
(Continued)

*Primary Examiner* — Hassan Mrabi
(74) *Attorney, Agent, or Firm* — Christensen O'Connor Johnson Kindness PLLC

(57) ABSTRACT

Embodiments generally relate to a method of creating a graphic file having a personalised message for printing on a stationery product. The method comprises receiving an unformatted message comprising a string of characters; displaying on a display device at least one font option for selection by a user; receiving a font selection from the displayed options; applying the font selection to the unformatted message and arranging the unformatted message into at least one line of characters to produce a formatted message, wherein the line has a writing axis along which the characters are positioned; generating an altered formatted message from the formatted message; and generating a graphic file based on the altered formatted message. Generating the altered formatted message comprises automatically and randomly altering the size of at least one of the characters of the formatted message; automatically altering the colour of the at least one character based on the altered size of the character, and automatically and randomly alter-
(Continued)

ing the angle of the writing axis of at least one line of the formatted message.

20 Claims, 16 Drawing Sheets

(51) Int. Cl.
    *G06Q 99/00*     (2006.01)
    *G06F 40/109*     (2020.01)
    *G06F 3/0482*     (2013.01)
    *G06F 3/12*     (2006.01)
    *G06T 3/40*     (2006.01)
    *G06T 3/60*     (2006.01)
    *G06T 11/00*     (2006.01)
    *G06T 11/20*     (2006.01)

(52) U.S. Cl.
    CPC ........ *G06F 3/04845* (2013.01); *G06F 3/1206* (2013.01); *G06F 3/1242* (2013.01); *G06F 40/109* (2020.01); *G06Q 99/00* (2013.01); *G06T 3/40* (2013.01); *G06T 3/60* (2013.01); *G06T 11/001* (2013.01); *G06T 11/203* (2013.01)

(58) Field of Classification Search
    CPC .. G06F 40/109; G06Q 30/0621; G06Q 99/00; G06T 3/40; G06T 3/60; G06T 11/001; G06T 11/203
    USPC .......................................................... 715/234
    See application file for complete search history.

(56) References Cited

U.S. PATENT DOCUMENTS

| | | | |
|---|---|---|---|
| 6,867,787 B1 * | 3/2005 | Shimizu | G06T 11/203 345/427 |
| 8,442,870 B1 | 5/2013 | Homan | |
| 9,507,765 B2 * | 11/2016 | Hogan | G06F 40/177 |
| 10,057,205 B2 * | 8/2018 | Spicer | H04L 51/32 |
| 2004/0234097 A1 | 11/2004 | Verhoeven et al. | |
| 2005/0034083 A1 * | 2/2005 | Jaeger | G06F 3/04855 715/863 |
| 2005/0231512 A1 * | 10/2005 | Niles | G06T 13/00 345/473 |
| 2006/0284851 A1 * | 12/2006 | Pittman | G06F 3/04883 345/173 |
| 2007/0055931 A1 * | 3/2007 | Zaima | G06F 40/149 715/206 |
| 2008/0092084 A1 * | 4/2008 | Lapstun | G06F 3/0321 715/854 |
| 2009/0016605 A1 * | 1/2009 | Chao | G06F 40/186 382/176 |
| 2011/0141493 A1 | 6/2011 | Berger et al. | |
| 2012/0318077 A1 * | 12/2012 | Paca | G09B 11/00 73/865.4 |
| 2014/0111416 A1 * | 4/2014 | Sugiura | G06F 3/03 345/156 |
| 2014/0198234 A1 * | 7/2014 | Kobayashi | H04N 1/32144 348/231.99 |
| 2015/0123988 A1 * | 5/2015 | Ohmori | G06F 3/03545 345/594 |
| 2015/0135127 A1 * | 5/2015 | Patel | G06F 3/04817 715/781 |
| 2016/0379048 A1 * | 12/2016 | Kumar | G06K 9/00402 382/159 |

OTHER PUBLICATIONS

International Search Report and Written Opinion dated Oct. 25, 2016, issued in corresponding International Application No. PCT/AU2016/050787, filed Aug. 25, 2016, 12 pages.

* cited by examiner

ONLINE SYSTEM AND METHOD FOR PERSONALISING A GREETING CARD OR STATIONERY WITH HANDWRITING AND DOODLES USING A COMPUTER

TECHNICAL FIELD

Described embodiments relate generally to computer graphics and typography. More specifically, the described embodiments relate to the creation of a computer graphics file intended to resemble human handwriting and/or hand drawn sketches for use on stationery products.

BACKGROUND

Sending paper greeting cards and other physical messages to communicate sentiment is a long-standing tradition that has not changed for decades. The convenience of purchasing greeting cards has improved in recent years with the ability to shop online, create a personalised design, review the design before ordering and have the design printed and mailed either directly to the recipient or to the purchaser, with no further modification required.

This convenience is often offset by the disappointment that the resulting product was clearly not designed by hand, as is traditionally the case, leaving the product imparting an impersonal feel and detracting from the sentiment of the gesture.

It is desired to address or ameliorate one or more shortcomings or disadvantages associated with prior systems for the creation of graphics files for use on stationery products, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a method of creating a graphic file having a personalised message for printing on a stationery product, the method comprising:
receiving an unformatted message comprising a string of characters;
receiving a font to apply to the unformatted message;
applying the font to the unformatted message and arranging the unformatted message into at least one line of characters to produce a formatted message, wherein the line has a writing axis along which the characters are positioned;
generating an altered formatted message from the formatted message by:
automatically and randomly altering the size of at least one of the characters of the formatted message;
automatically altering the colour of the at least one character based on the altered size of the character, and
automatically and randomly altering the angle of the writing axis of at least one line of the formatted message; and
generating a graphic file based on the altered formatted message.

Some embodiments further comprise:
displaying on the display device at least one vector graphic option for selection by the user;
receiving a vector graphic selection from the displayed options;
automatically altering at least one of the line thickness and line colour of the selected vector graphic, based on the font selection;
inserting the altered graphic vector into the graphic file.

Some embodiments further comprise:
displaying on the display device at least one template artwork option;
receiving a template artwork selection from the displayed options;
add the template artwork to the graphic file based on the selected template artwork option.

Some embodiments further comprise:
automatically communicating the graphic file to a printing device to cause the graphic file to be printed on a stationery item.

In some embodiments, the stationery item is at least one of a greeting card, an envelope, a tag, a label, or a sheet of paper.

In some embodiments, the method further comprises:
receiving a physical address from the user;
communicating the physical address to an external device in order to cause the stationery item to be sent to the physical address.

Some embodiments further comprise automatically and randomly altering a rotation of at least one of the characters of the formatted message. In some embodiments, the rotation is altered to be within 10° of an unaltered rotation of the character. In some embodiments, the rotation is altered to be within 7° of the unaltered rotation of the character. In some embodiments, the rotation is altered to be within 3° of the unaltered rotation of the character.

According to some embodiments, the size of the at least one character is altered within a limit based on a size of the selected font. In some embodiments, the size of the at least one character is altered to be between 60% and 140% of the size of the selected font. In some embodiments, the size of the at least one character is altered to be within 80% and 120% of the size of the selected font. In some embodiments, the size of the at least one character is altered to be within 90% and 110% of the size of the selected font.

According to some embodiments, the angle of the writing axis of the at least one line is altered within a limit from an unaltered angle of the writing axis of the at least one line. In some embodiments, the angle of the writing axis of the at least one line is altered to be within 3° of the unaltered angle of the writing axis of the at least one line. In some embodiments, the angle of the writing axis of the at least one line is altered to be within 1.5° of the unaltered angle of the writing axis of the at least one line. In some embodiments, the angle of the writing axis of the at least one line is altered to be within 0.5° of the unaltered angle of the writing axis of the at least one line.

According to some embodiments, the angle of the writing axis of each line is within a limit of the angle of the writing axis of each adjacent line. In some embodiments, the angle of the writing axis of each line is within 1° of the angle of the writing axis of each adjacent line. In some embodiments, the angle of the writing axis of each line is within 0.5° of the angle of the writing axis of each adjacent line. In some embodiments, the angle of the writing axis of each line is within 0.25° of the angle of the writing axis of each adjacent line.

According to some embodiments, automatically altering the colour of the at least one character based on the altered size of the character comprises automatically making the colour of the character darker if the altered size of the character is smaller than an unaltered size of the character.

In some embodiments, automatically altering the colour of the at least one character based on the altered size of the character comprises automatically making the colour of the character lighter if the altered size of the character is larger than an unaltered size of the character.

In some embodiments, automatically altering the colour of the at least one character based on the altered size of the character comprises automatically making the change in colour of the character proportional to the change in size of the character. According to some embodiments, the change in colour of the character is proportional to half the change in size of the character.

Some embodiments further comprise:
displaying on a display device at least one stroke width option for selection by a user;
receiving a stroke width selection from the displayed options;
applying the stroke width selection to the formatted message and any vector graphics.

Some embodiments further comprise:
displaying on a display device at least one colour option for selection by a user;
receiving a colour selection from the displayed options;
applying the colour selection to the formatted message and any vector graphics before altering the formatted message.

Some embodiments further comprise:
displaying on a display device at least one font size option for selection by a user;
receiving a font size selection from the displayed options;
applying the font size selection to the formatted message before altering the formatted message.

Some embodiments relate to a method for the generating of a graphic file as part of a personalized greeting card, the method comprising:
receiving card template and personalization data to be associated with an order to be printed and sent to a recipient;
receiving a user's font selection from a selection of presented font options, the font selection having a font size;
receiving a personal message from the user to be included as part of the graphic file to be printed as part of the personalized greeting card, the personal message comprising lines of text;
automatically rotating randomly the lines of text of the personal message by −1.5 to 1.5 degrees on the axis in the direction of the lines of text, such that no two adjacent lines differ by more than 1.0 degrees;
automatically resizing randomly the letters of the personal message by up to 20% larger than the font sixe and up to 20% smaller than the font size;
automatically making a colour of a letter darker if the letter is smaller than the font size;
automatically making a colour of a letter lighter if the letter is larger than the font size; and
automatically making the line width and colour of a selected vector graphic match the font selection.

Some embodiments relate to a method of creating a graphic file having a personalised message for printing on a stationery product, the method comprising:
receiving a personalised message in the form of lines of text;
displaying at least one font option for selection;
receiving a font selection from the presented options;
applying the font selection to the personalised message;
automatically manipulating the colour of the letters of the personalised message based on the size of the letters of the personalised message;
automatically manipulating the angle of the lines of text of the personalised message; and
generating a graphic file based on the manipulated personalised message.

Some embodiments relate to a computer-readable medium storing machine-readable instructions, which when executed by a processor, causes the processor to perform the method of some other embodiments.

Some embodiments relate to a system for creating a graphic file having a personalised message for printing on a stationery product, the system comprising:
a client device comprising at least one processor and at least one memory device storing executable code accessible to the processor, the client device being configured to:
receive an unformatted message comprising a string of characters;
display on a display device at least one font option for selection by a user;
receive a font selection from the displayed options;
apply the font selection to the unformatted message and arrange the unformatted message into at least one line of characters to produce a formatted message, wherein the line has a writing axis along which the characters are positioned;
generate an altered formatted message from the formatted message by:
automatically and randomly altering the size of at least one of the characters of the formatted message;
automatically altering the colour of the at least one character based on the altered size of the character, and
automatically and randomly altering the angle of the writing axis of at least one line of the formatted message; and
a server device, the server being configured to receive the altered formatted message from the client device and generate a graphic file based on the altered formatted message.

According to some embodiments, the client device is further configured to:
display on the display device at least one vector graphic option for selection by the user;
receive a vector graphic selection from the displayed options; and
automatically alter at least one of the line thickness and line colour of the selected vector graphic, based on the font selection; and
the server device is further configured to insert the altered graphic vector into the graphic file.

According to some embodiments, the client device is further configured to:

display on the display device at least one template artwork option; and receive a template artwork selection from the displayed options; and the server device is further configured to add the template artwork to the graphic file based on the selected template artwork option.

Some embodiments further comprise a printing device, wherein the server device is configured to automatically communicate the graphic file to the printing device to cause the graphic file to be printed on a stationery item.

BRIEF DESCRIPTION OF THE DRAWINGS

Embodiments are described in further detail below, by way of example and with reference to the accompanying drawings, in which.

DETAILED DESCRIPTION

Described embodiments relate generally to computer graphics and typography. More specifically, the described embodiments relate to the creation of a computer graphics file intended to resemble human handwriting and/or hand drawn sketches for use on stationery products.

Existing systems for producing customised printed messages on a product do not produce text that can closely resemble human handwriting. Some existing systems employ handwriting style fonts, in which each character may resemble a handwritten character, but each character is limited in variation, and the overall appearance of the text is too consistent to have been hand written. Other systems digitally capture a sample of handwriting analog, such as through the use of a computer stylus or a finger on a touch interface, but fail to accurately replicate the handwriting of the same person if they were to use a traditional writing implement such as a pen.

There is a compelling need for computer systems to mimic the imperfections of handwriting for the purpose of creating resulting artwork with a more human, personal feel.

A system and method are described for the generation of a graphic file having a personalised message for printing on a personalized greeting card, postcard, letter, gift tag, label or other stationery product, where the text in the graphic file resembles a user's handwriting. The graphic file may also include doodles, sketches or other roughly drawn images that the user has added to make it resemble what they would have written and drawn within a physical card, postcard, letter, gift tag, label, or other stationery product.

Described below is a graphic file generation system and method implemented within a stationery and/or greeting card service. Throughout the description, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form to avoid obscuring the underlying principles of the present invention.

Figure 1:
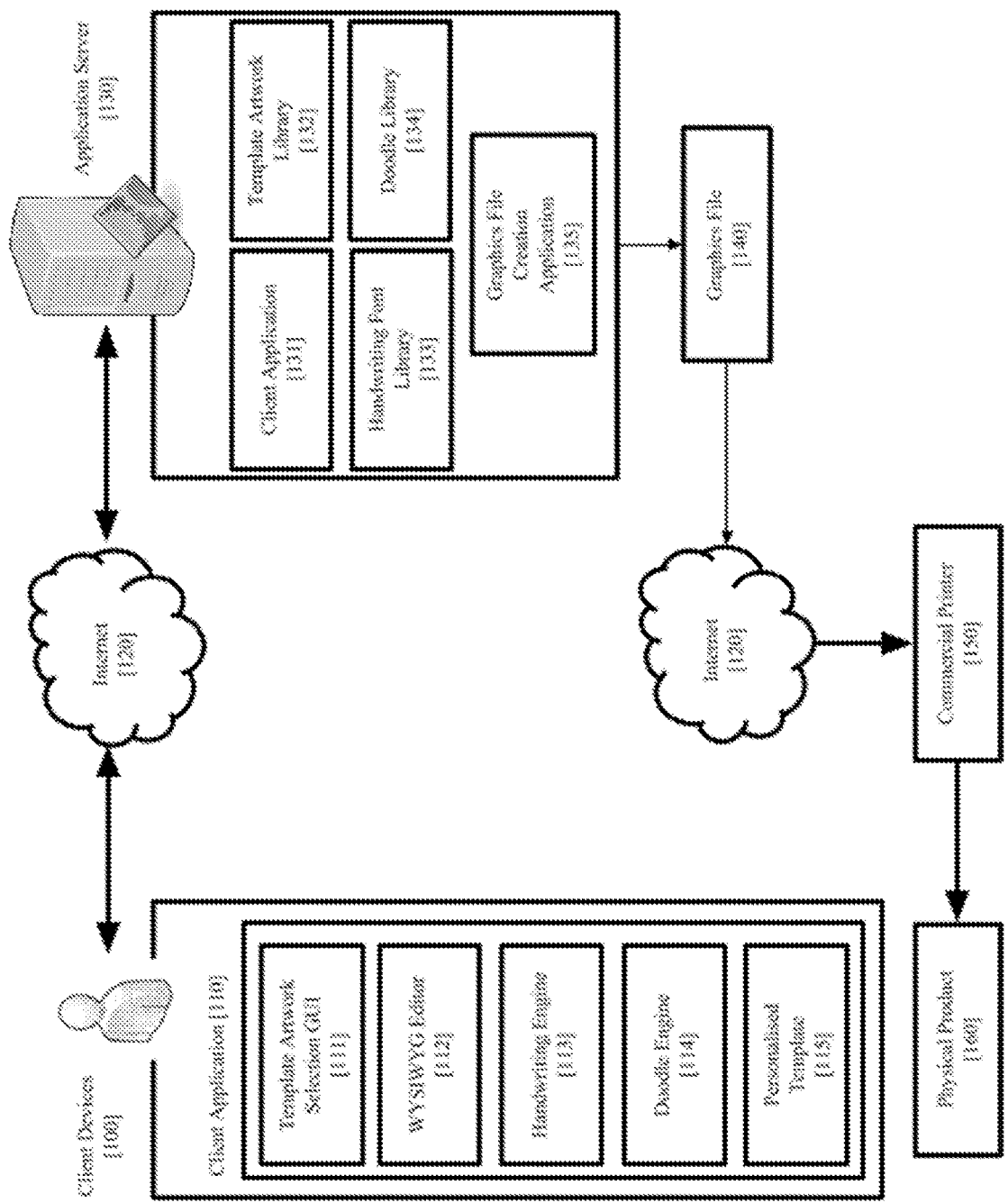
FIG. 1 is a block diagram of a system architecture of a stationery/card service which includes a card editor according to some embodiments.

FIG. 1 illustrates a system infrastructure of a graphic file generation system according to some embodiments. A client device 100 communicate with an application server 130 through a network, which may be the internet 120 in some embodiments. In some alternative embodiments, the network may be a local area network (LAN), wide area network (WAN), or other type of network.

Application server 130 may store data and applications for access by client application 110, the data including the original copy of client application 131, a template artwork library 132, a handwriting font library 133, a doodle library 134, and a graphics file creation application 135.

According to some embodiments, client device 100 retrieves client application 131 from application server 130, where client application 131 comprises code executable by client device 100. According to some embodiments, client device 100 stores a copy of the entirety of client application 131 in a memory device local to client device 100, the copy being client application 110. According to some alternative embodiments, client device 100 may copy parts of client application 131 to a memory device local to client device 100 at a time. In some embodiments, client application 131 may reside in application server 130 for client device 100 to access as required. According to some embodiments, the system may comprise more than one client device 100 and/or more than one application server 130.

Client application 110 may comprise a number of code modules, including a template artwork selection GUI module 111, a WYSIWYG editor module 112, a handwriting engine 113, a doodle engine 114, and a personalised template module 115.

According to some embodiments, executing template artwork selection GUI module 111 causes a display of client device 100 to show a GUI that allows a user to select a template artwork to appear as part of the product to print. According to some embodiments, templates may dictate what product the graphics file is to be printed to, and which pre-designed artwork will appear on the product. For example, a user may be able to select artwork that will appear on the front of a greeting card or postcard. Client device 100 may retrieve one or more template artworks for display by template artwork selection GUI module 111 from template artwork library 132.

Once a user selects a template artwork, their selection may be passed to WYSIWYG editor module 112 to allow the user to personalise the product, such as by entering text for a personalised message within an editable area of the product. Execution of handwriting engine 113 may cause a number of fonts to be displayed for the user to select. The fonts may be retrieved from handwriting font library 133. The selected font may be applied to an unformatted message entered as text added to the product by the user. The text may also be arranged into one or more lines of characters to produce a formatted message, wherein each line has a writing axis along which the characters are positioned. The axis may be horizontal or vertical along the page, for example.

Execution of doodle engine 114 may cause a number of doodles or sketches in the form of graphic vectors to be displayed for the user to select. The doodles may be retrieved from doodle library 134. The selected doodle may be applied to the product.

Execution of personalised template module 115 may use handwriting engine 113 and doodle engine 114 to alter the selected font and doodles in order to cause the doodles and handwriting to appear as if written and drawn by hand. Personalised template module 115 may output a graphics file 140. According to some embodiments, graphics file 140 may be generated by client device 100 and communicated to application server 130 via internet 120. According to some alternative embodiments, graphics file 140 may be generated by application server 130 based on data received from client device 100 via internet 120.

Graphics file 140 may contain data that describes to a computing device how to display a visual representation of a personalised template, and represents writing and doodles produced by hand with a writing implement. According to some embodiments, graphics file 140 may be automatically communicated through the internet 120 to a commercial printer 150 or other printing device for printing on one or more physical products 160, which may be stationery products such as greeting cards, postcards, letters, gift tags, or labels, envelopes, notes, brochures, product labels, pieces of paper and other products traditionally associated with handwriting where a simulated replacement would be beneficial. According to some embodiments, physical product 160 may be sent through physical mail or post to a recipient.

Figure 1A:
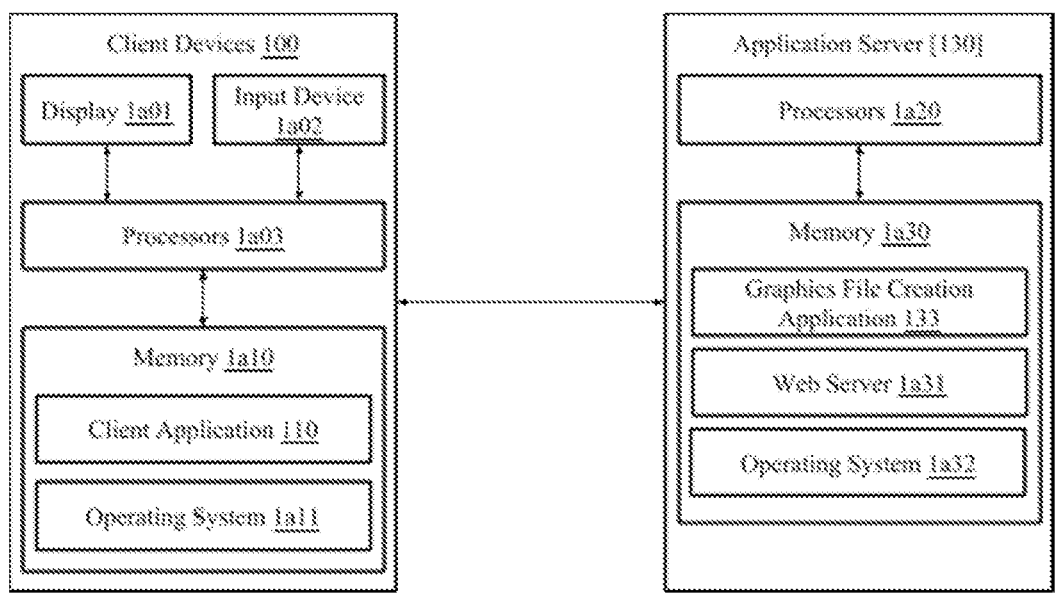
FIG. 1a is block diagram of a client device and server of the stationery/card service of FIG. 1, showing functional models of the client and server in further detail.

FIG. 1*a* is a block diagram showing the components of client device 100 and application server 130 in more detail. Client devices 100 may comprise a desktop, laptop or mobile computing device, having a display 1*a*01, at least one input device 1*a*02, at least one processor 1*a*03, one or more forms of memory 1*a*10, and an operating system 1*a*11. Memory 1*a*10 may comprise volatile and/or non-volatile storage. Input device(s) 1*a*02 might include a touch-screen, keyboard, mouse, stylus or another peripheral device used for providing user input to a computer.

In a preferred embodiment, the client device 100 stores client application 110 and operating system 1*a*11 in memory 1*a*10. Client application 110 and operating system 1*a*11 may comprise computer code executable by processor 1*a*03. Execution of operating system 1*a*11 facilitates the execution of the other functions of client device 100.

A person skilled in the art will note that the functions of the client application 110 that do not concern the display 1*a*01 or input from an input device 1*a*02 need not be performed by client device 100 and may instead be performed by application server 130 or a similar external computing device. However, this may introduce undesired latency to the system.

Application server 130 may comprise one or more server devices or server systems, or a number of virtual and/or dedicated servers cooperating and in communication over a network. According to some embodiments, application server 130 may be distributed server network or a cloud based server. Application server 130 may comprise at least one processor 1*a*20, and one or more forms of memory 1*a*30. Memory 1*a*10 may comprise volatile and/or non-volatile storage.

Memory 1*a*10 may store a graphics file creation application 135, web server 1*a*31 and an operating system 1*a*32. These may each be executable by processor 1*a*20. Execution of web server 1*a*31 facilitates communication between application server 130 and client device 100 via the internet 120. Execution of graphics file creation application 135 facilitates transformation of the text and doodles modified by personalised template module 115 into graphics file 140. Execution of operating system 1*a*32 facilitates the execution of the other functions of application server 130.

Figure 2:
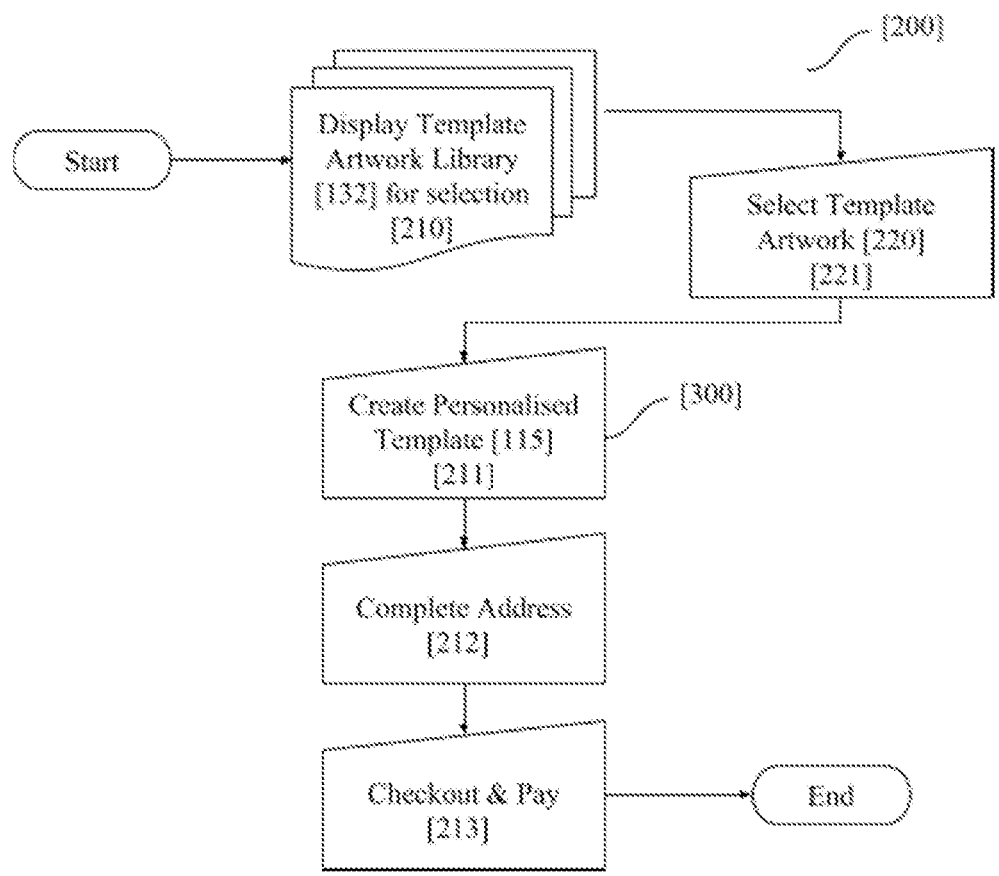
FIG. 2 is a flow chart showing a method executed by a stationery/card service of FIG. 1.

FIG. 2 shows a flowchart illustrating a method 200 for a user of the service of FIG. 1 to personalise and order a physical product 160. At step 210, client application 110 causes display 1*a*01 of client device 100 to present the user with a GUI that displays a number of template artwork options retrieved from template artwork library 132.

At step 221 the user selects a template artwork from the options presented, their selection being selected template artwork 220. At step 211, client application 110 causes personalised template module 115 to add to the template selected by the user by adding and altering text and sketches entered or selected by the user. The execution of personalised template module 115 is discussed in further detail below with reference to FIG. 3. At step 212 the user is prompted via display 1*a*01 to enter a recipient physical address for postage of physical product 160. The user then confirms the order and pays for the product at step 213. At this stage the design created via personalised template module 115 is transmitted to application server 130 to generate graphics file 140.

Figure 3:
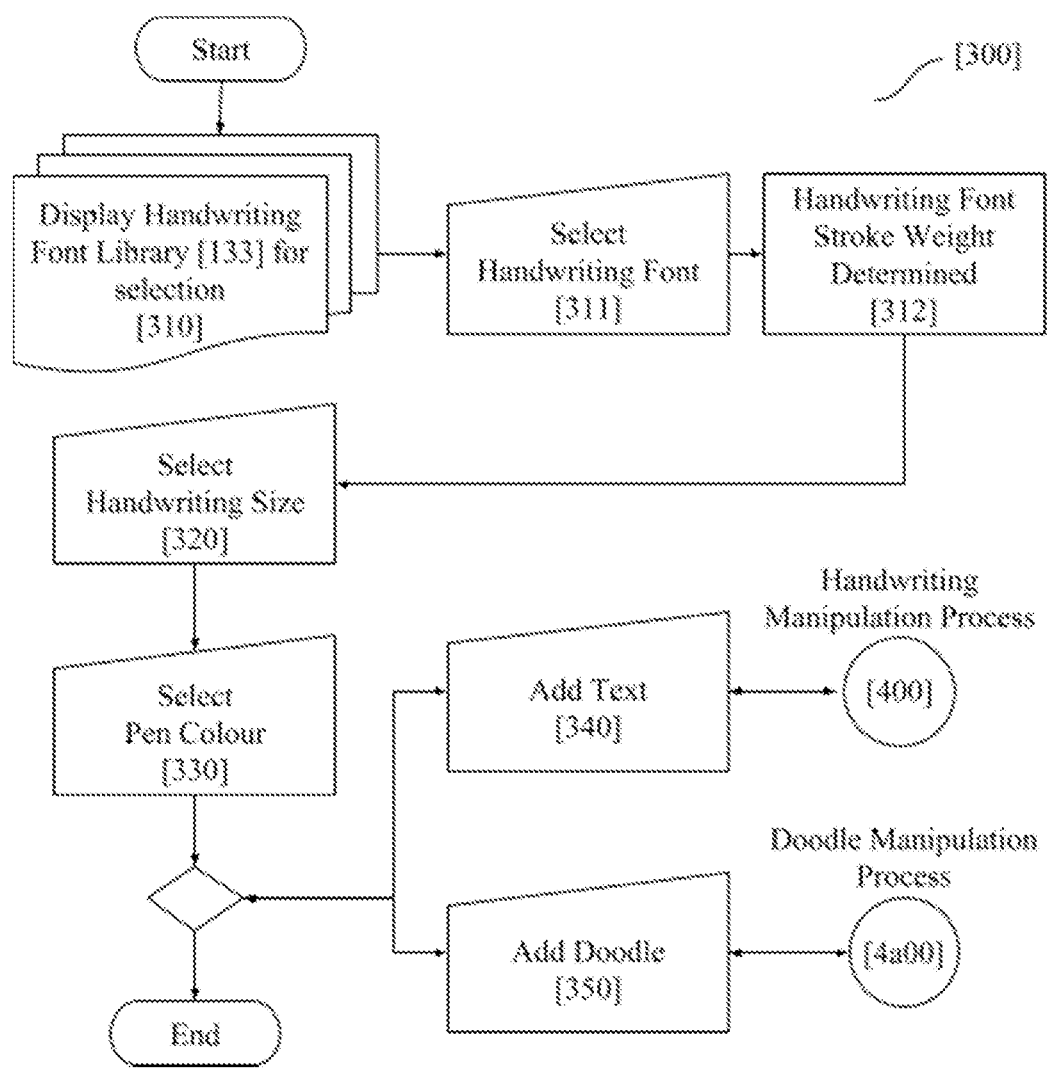
FIG. 3 is a flow chart showing a method executed by a card editor of FIG. 1, the method including the creation of a personalized message (output as a graphic file) that resembles a user's own handwriting and doodles.

FIG. 3 shows a flowchart illustrating a method 300 of personalising a template via personalised template module 115 based on a selected template artwork 220. According to some embodiments, method 300 may be performed during step 211 as described above with reference to FIG. 2.

At step 310, client application 110 causes display 1a01 of client device 100 to present a number of font options retrieved from handwriting font library 133 to a user, so that the user can choose a base handwriting font that appeals to them. For example, a user may select a font style that most closely matches their own handwriting. An example of the GUI that may be displayed in step 310 is described below with reference to FIG. 6. The font selection is applied to the unformatted message entered by the user.

Once a base handwriting font is selected at step 311, the handwriting font stroke width or line thickness is determined at step 312. According to some embodiments, the handwriting font stroke width may be pre-determined based on a default width of the selected font. According to some embodiments, the default width may be manually selected to appear visually pleasing and to mimic natural handwriting when used with the selected font. According to some embodiments, the font stroke width may be selected by a user. Adjusting the handwriting font stroke width allows the text to appear as though it was drawn or written using a writing implement such as a pen or pencil.

Figure 8:
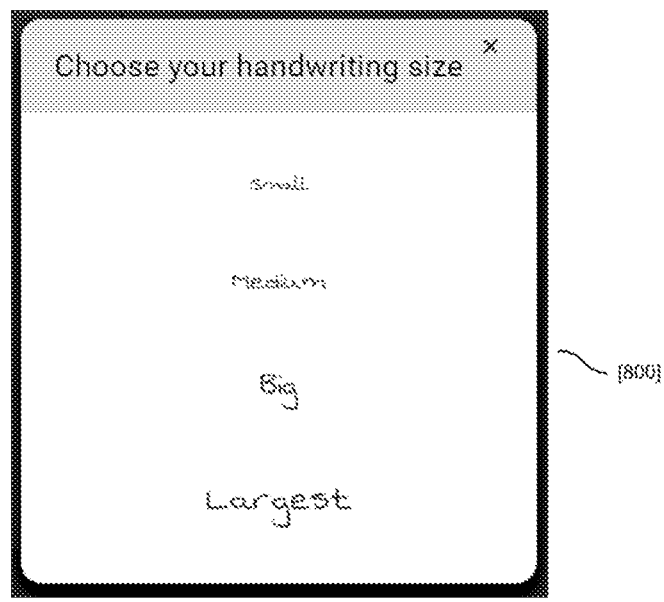
FIG. 8 is an example GUI that may be displayed on a client device of the system of FIG. 1 showing a WYSIWYG screen for selecting handwriting size according to some embodiments.

At step 320, a GUI may be presented on display 1a01 to allow a user to select a handwriting size. One example of a GUI that may be displayed at step 320 is shown in FIG. 8. According to some embodiments, the GUI may present the user with a list of predetermined sizes. According to some other embodiments a different form of size selection, such as a slider control, may be used to allow the user to choose from a broader range of handwriting sizes. Other embodiments of size selection are discussed below in further detail with reference to FIG. 8.

Figure 9:
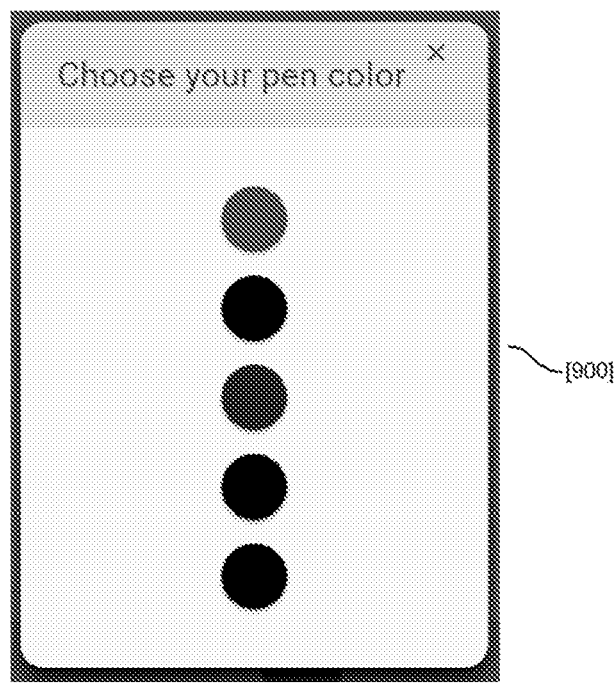
FIG. 9 is an example GUI that may be displayed on a client device of the system of FIG. 1 showing a WYSIWYG screen for selecting handwriting colour according to some embodiments.

At step 330, a GUI may be presented on display 1a01 to allow a user to select a pen colour. One example of a GUI that may be displayed at step 330 is shown in FIG. 9. According to some embodiments, the GUI may present the user with a list of predetermined colours, which may be selected to approximate traditional ballpoint pen colours in shades of blue and grey. According to some embodiments, a colour picker control may be displayed to allow the user to choose from a broader range of colours. Other embodiments of colour selection are discussed below in further detail with reference to FIG. 8.

Figure 7:
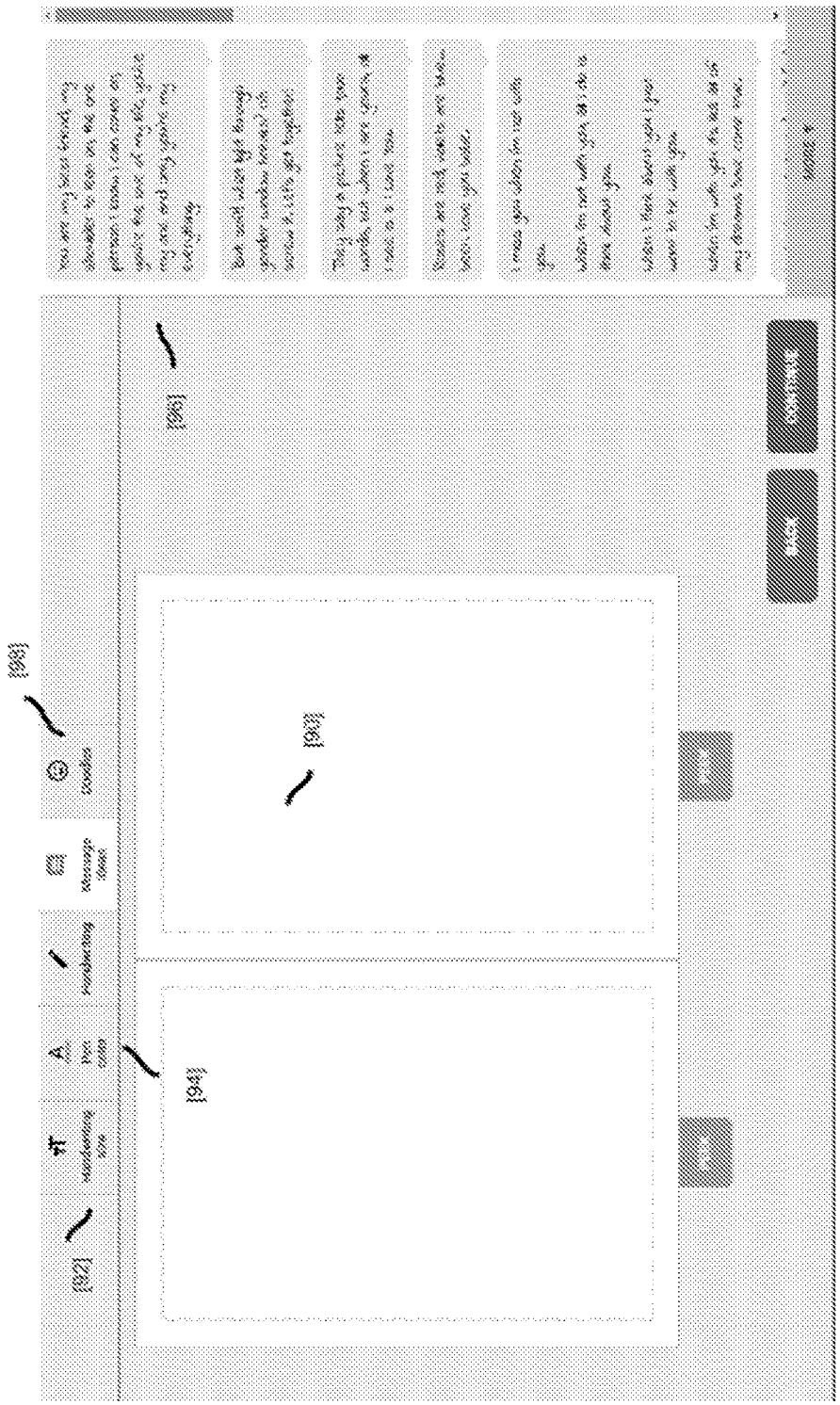
FIG. 7 is an example GUI that may be displayed on a client device of the system of FIG. 1 showing a what-you-see-is-what-you-get (WYSIWYG) screen and an editable area used to create the personalised message and ultimately the graphic file that is printed on the physical printed product.

At steps 340 and 350, the user may then be presented with a WYSIWYG GUI on display 1a01, which may allow them to add text or doodles to their template. Step 240. An embodiment of the WYSIWYG GUI is illustrated in FIG. 7. If text is added at step 340, client device 100 executes a handwriting manipulation method 400, which is discussed below in more detail with reference to FIG. 4. Method 400 may allow the selected handwriting font to more closely resemble human handwriting.

If a doodle is added at step 350, client device 100 executes a doodle manipulation method 4a00, which is discussed below in more detail with reference to FIG. 4. Method 400 may allow the selected doodle to more closely resemble a human drawing drawn with the same writing implement that might have been used to draw the characters in the selected handwriting font.

When the user is done adding text and doodles via personalised template module 115, the final modified template is transmitted to application server 130.

Figure 4:
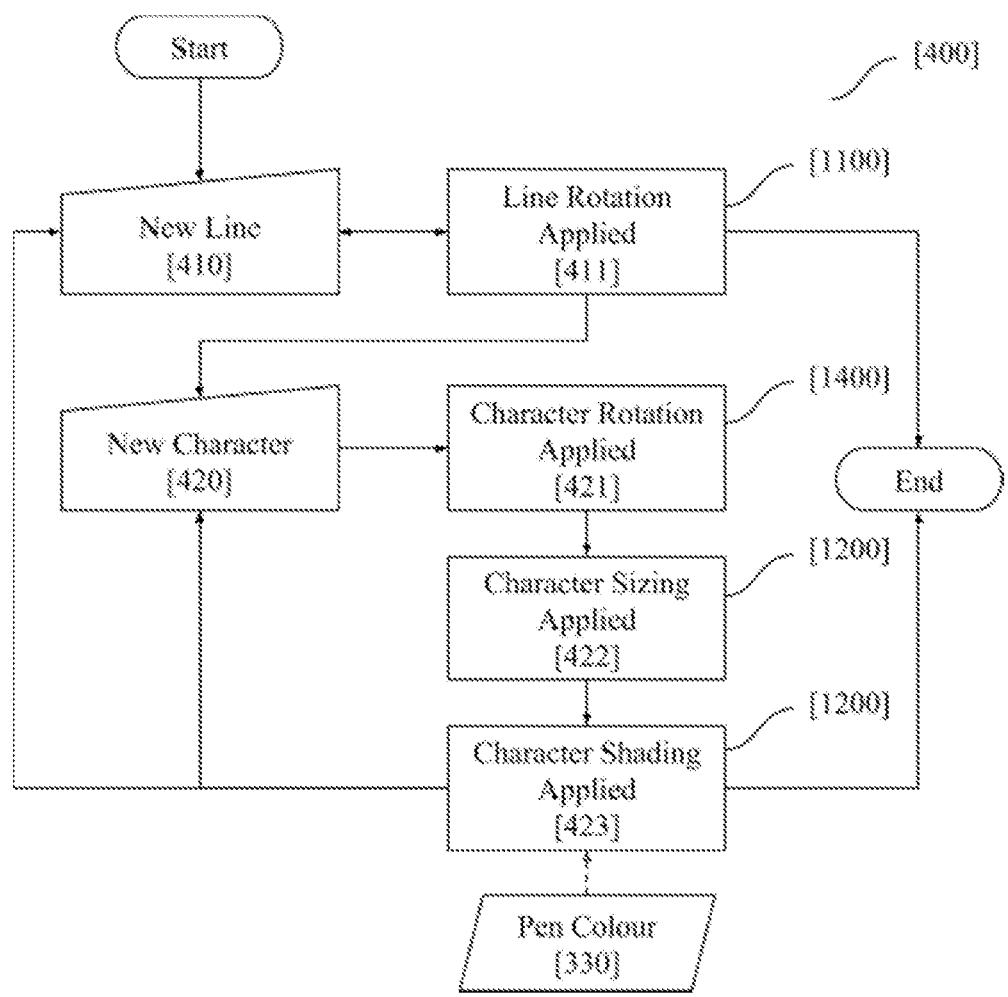
FIG. 4 is a flow chart showing a method of altering text according to some embodiments.

FIG. 4 shows a flowchart illustrating a method 400 for manipulating text into a form that more closely resembles human handwriting. Using input device 1a02 of client device 100, a user creates a new line of text at step 410, which may be stored as an unformatted message in the form of a string of characters. At step 411, a line rotation is applied to the line of text. This step is described in further detail below with reference to FIG. 11.

At step 420, a user uses input device 1a02 of client device 100 to enter a new character 420. This step may be performed before, after, or as part of step 410. The character entered by the user may form the start of a new string of characters, or may be added to an existing string of characters. Character rotation is applied to the new character at step 421. This step is described in further detail below with reference to FIG. 14. At step 422, character sizing is applied to the newly added character. At step 423, character shading is applied to the character, which may be determined based on the previously selected pen colour as selected at step 330 of FIG. 3. Steps 422 and 423 are described in further detail below with reference to FIG. 12. This produces an altered formatted message.

The user may continue to enter more new lines and/or more characters until text entry is complete.

Figure 4A:
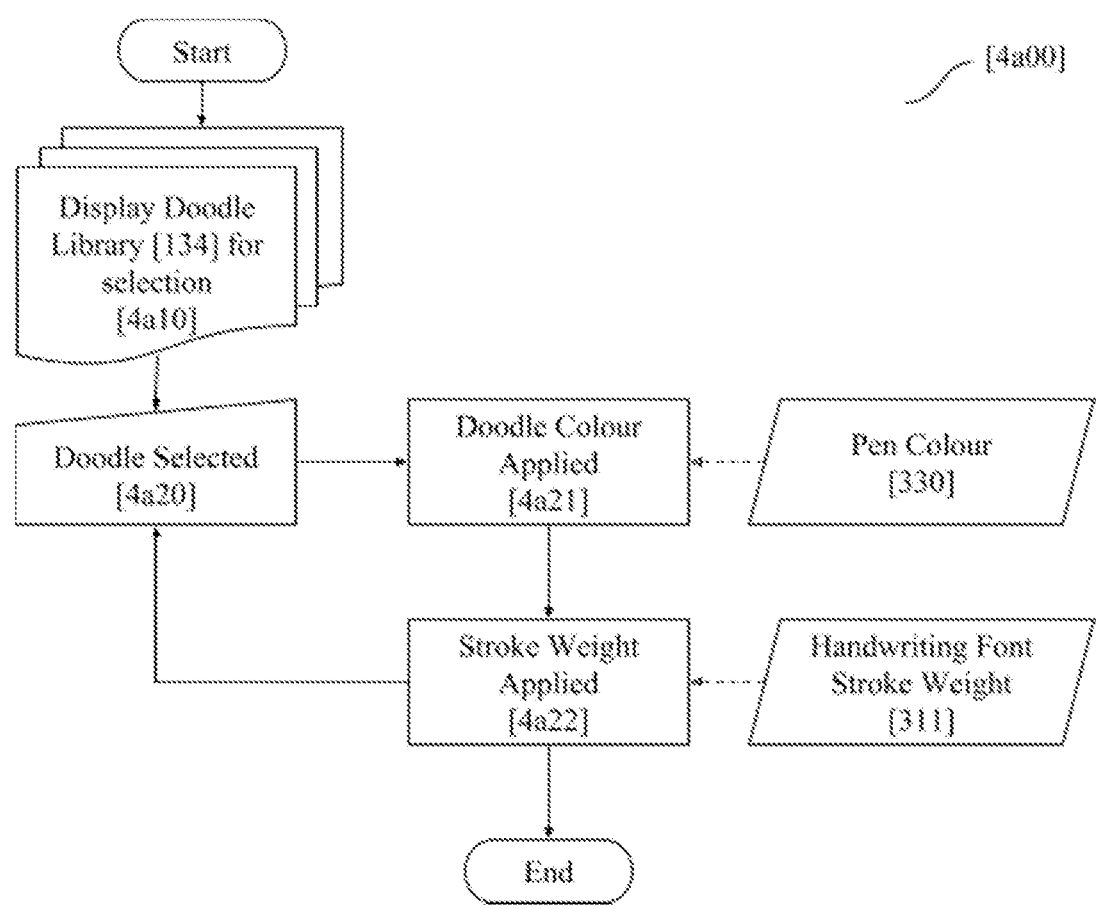
FIG. 4a is a flow chart showing a method of altering a vector graphic according to some embodiments.
Figure 10:
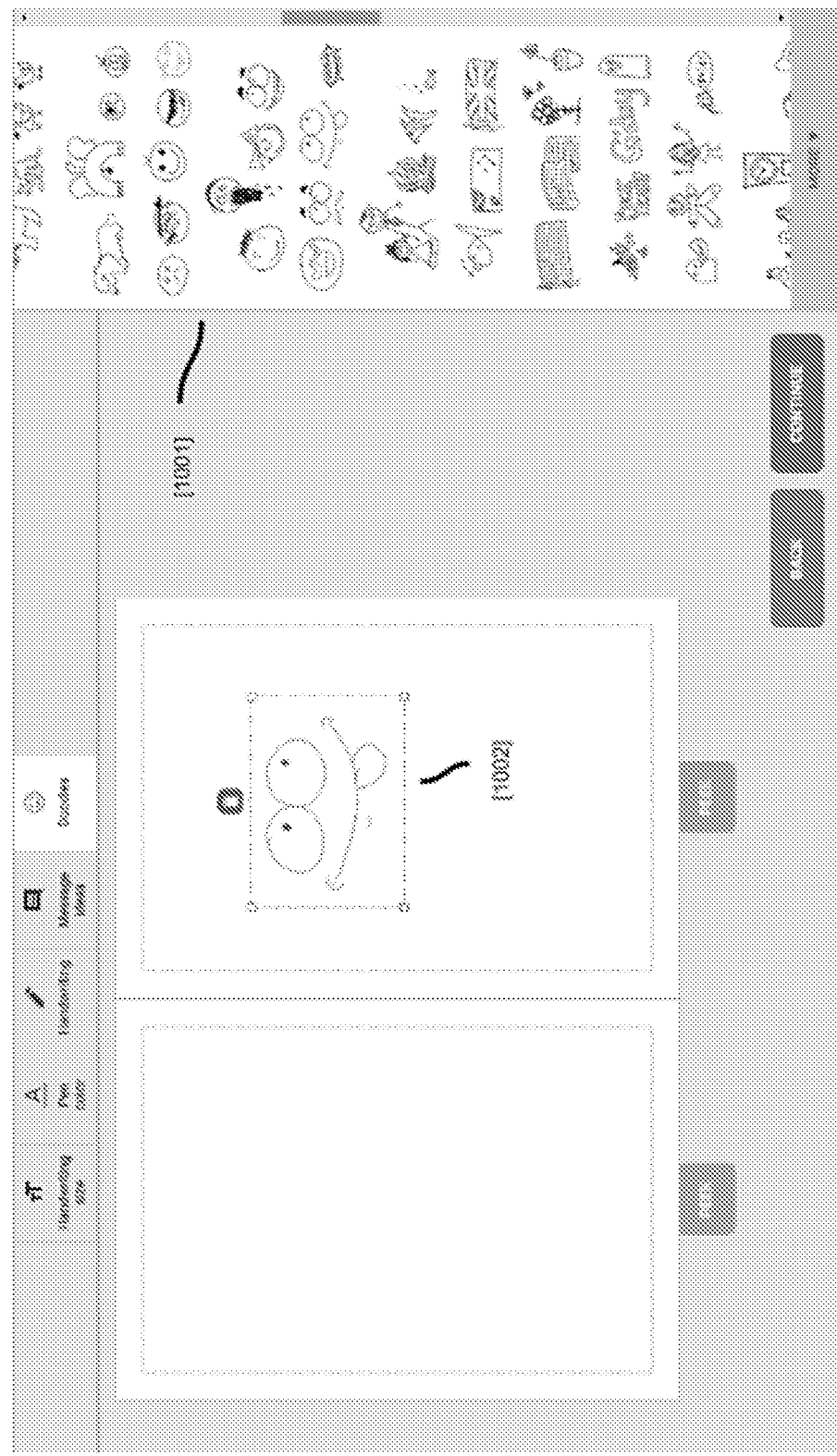
FIG. 10 is an example GUI that may be displayed on a client device of the system of FIG. 1 showing a WYSIWYG screen for selecting a doodle according to some embodiments.

FIG. 4a shows a flowchart illustrating a method 4a00 for manipulating a doodle into a form that more closely resembles a doodle drawn by a person with the sample writing implement that may have been used to write the characters in method 400. At step 4a10, client application 110 causes display 1a01 of client device 100 to display a GUI representation of a number of doodle option retrieved from doodle library 134. An example of a GUI that may be displayed at step 4a10 is shown in FIG. 10. At step 4a20, the user selects a doodle using input device 1a02. This may be done by using a mouse to click and drag the doodle from a library area of the GUI onto a workspace area of the GUI. According to some embodiments, a doodle may be selected by using a touchscreen to touch and drag the doodle from the library area onto workspace area. At step 4a21, once a doodle is selected it has a colour is applied to the doodle using the previously selected colour chosen at step 330 of FIG. 3. At step 4a22, a stroke weight is applied to the doodle using the stroke weight determined at step 311 of FIG. 3.

The user may continue to add more doodles until doodle selection is complete.

Figure 5:
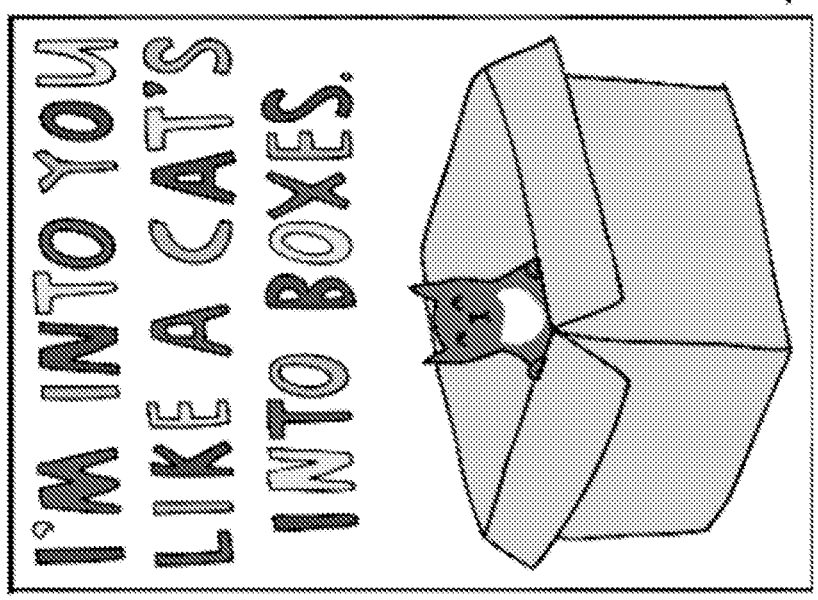
FIG. 5 is an example graphical user interface (GUI) that may be displayed on a client device of the system of FIG. 1 for reviewing a selected stationery/greeting card design and advancing to the personalisation step.

FIG. 5 illustrates an example GUI which may be presented to the user on display 1a01 for the user to review the template artwork selected by the user at step 221 of FIG. 2. The GUI include a graphical representation of the selected artwork 80, as well as information about the artwork, such as a title, who the artwork is by, shipping costs and times, the size of the product to which the artwork is to be applied, and other details about the product. The GUI may also include a virtual button, which may be "Write In Card" button 82, for example. Clicking on button 82 may cause client application 110 to begin a customisation process for the selected template. Upon selecting the template and selecting "write in card" the user will be begin the editing process.

Figure 6:
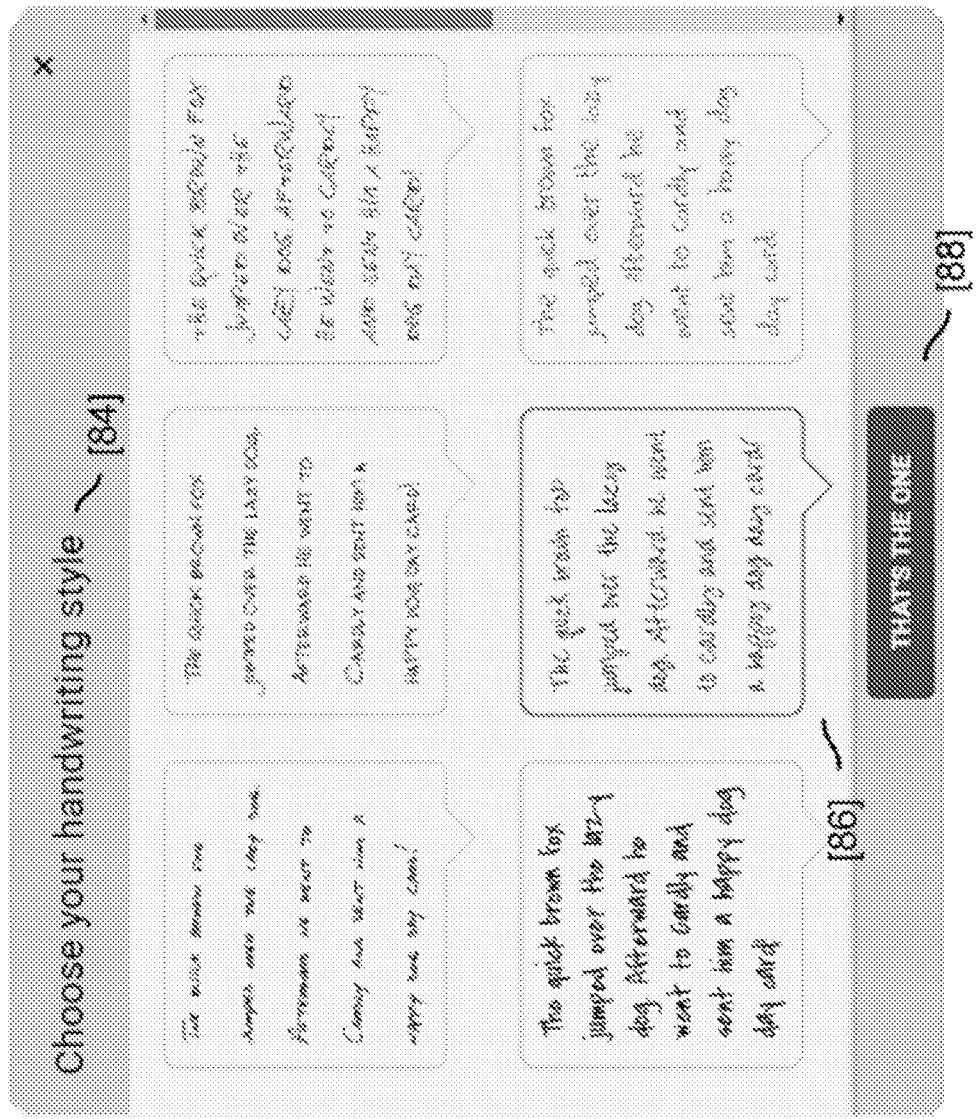
FIG. 6 is an example GUI that may be displayed on a client device of the system of FIG. 1 for selecting a font according to one embodiment of the invention.

FIG. 6 illustrates an example GUI which may be presented to the user on display 1a01 for the user to select a font to be applied to the unformatted message at step 311 of FIG.

3. According to some embodiments, the GUI of FIG. 6 may be displayed on display 1a01 after the user presses button 82 of FIG. 5. The GUI of FIG. 6 prompts the user to choose a handwriting style via message 84. Display 1a01 is caused to present the user with a range of different handwriting styles 86, as demonstrated by a piece of sample text of each available font. The user can select the desired handwriting style or font and click on virtual "That's The one" button 88 to confirm their selection.

FIG. 7 illustrates an example GUI which may be presented to the user on display 1a01 for the user to enter text to be added to the selected template, as described above with reference to step 340 of FIG. 3. The GUI of FIG. 7 displays a WYSIWYG environment that facilitates the editing of the inside of the selected greeting card or other stationery product. A graphics file including text and doodles that resemble those that a user may put inside a greeting card are added to the stationery product. The GUI of FIG. 7 displays a working area 90 in which a user can write a personal message. The message may be entered using user interface device 1a02 of client device 100, and may be stored in memory 1a10 as an unformatted message comprising a string of characters. The GUI may also allow the user to adjust the handwriting size and colour of the text using size selection tool 92 and colour selection tool 94. The GUI further includes a tab that may allow a user to choose from one or more pre-written messages 96 to help with the drafting of their personal message, and a tab that contains doodles 98 that the user can drag and drop into the working area 90.

FIG. 8 illustrates an example GUI 800 which may be presented to the user on display 1a01 for the user to select a font size for their text, as described above with reference to step 320 of FIG. 3. GUI 800 may be presented when the user clicks on size selection tool 92 of FIG. 7. According to some embodiments, a user may be able to select the font size by selecting from a drop down list containing a number of size options, as shown in FIG. 8. For example, four size options may be presented, being small, medium, big and largest in some embodiments. Alternatively, the user may be able to change the size of the font by moving a slider, clicking a radio control button, or entering a font size via a text box, for example. Once selected, the size of the text written by the user in working area 90 of FIG. 7 is adjusted to the selected size.

In order to give the appearance of handwriting, the selected size may be used as the average of base size for the written text, but the individual characters in the text may be automatically and randomly altered to a size to a smaller or larger size than the base size, to produce an altered formatted message. For example, each character of the text entered in working area 90 may be randomly resized to between 70% and 130% of the base size. In a preferred embodiment, determined by the study of handwriting samples, characters are randomly resized by 80% to 120%, to give the best approximation of natural handwriting variations. In other embodiments, where a less neat or steady appearance is desired, characters are randomly resized to between 60% to 140% of the base size. In other embodiments where a neat or steady appearance is desired, characters are randomly resized to between 90% and 110% of the base size.

This resizing is done to more accurately replicate the randomness of character size when handwriting rather than when using a computer to type. As the sizes of characters are randomly made smaller and larger, according to some embodiments the colours of the characters are also changed slightly to represent the varied weight of pen pressure to achieve a smaller or larger character. If a character is resized smaller than the base size, the colour of the character may be made slightly darker to simulate the harder pen pressure that is needed for the tight turns of a smaller character. If a character is resized to be larger than the base size, the colour of the character may be made slightly lighter to simulate the lower pen pressure that is needed for the looser turns of the larger character. According to some embodiments, the selected colour is darkened or lightened relative to the amount the character size has changed from the selected size. For example, if the character is 10% larger than the selected font its colour will be lightened by 5%, and if a character is 8% smaller than the selected font, its colour will be darkened by 4%.

FIG. 9 illustrates an example GUI 900 which may be presented to the user on display 1a01 for the user to select a font colour for their text, as described above with reference to step 330 of FIG. 3. GUI 900 may be presented when the user clicks on colour selection tool 94 of FIG. 7. According to some embodiments, a user may be able to select the colour by selecting from a drop down list containing a number of colour options, as shown in FIG. 9. For example, four colour options may be presented in some embodiments. Alternatively, the user may be able to change the colour of the font by moving a slider, clicking a radio control button, or entering a colour code via a text box, for example. Once selected, the colour of the text written by the user in working area 90 of FIG. 7 is adjusted to the selected colour.

As described above, based on the size of the characters of the text being randomly made smaller and larger, the colours of the characters may be changed slightly to represent the varied weight of pen pressure to achieve a smaller or larger character. If a character is larger than the selected size, the colour is lightened to simulate the lower pen pressure used as the writer adjusts for looser curves and broader range of pen movement. If a character is smaller than the selected font size, the colour is darkened to simulate the higher pen pressure used as the writer adjusts for tighter curves and more restricted range of pen movement. According to some embodiments, the colour is darkened or lightened proportional to half the adjustment from the selected font size and colour selected by the user. For example, if the character is 10% larger than the selected font its colour will be lightened by 5%. It follows that if a character is 8% smaller than the selected font its colour will be darkened by 4%.

FIG. 10 illustrates an example GUI which may be presented to the user on display 1a01 for the user to add doodles, sketches, or other vector graphics to their template, as described above with reference to step 350 of FIG. 3. According to some embodiments, a user can make a selection from a library of doodles 1001 displayed to them, and can drag and drop a selected doodle 1002 onto an editing area of the GUI. The doodles may be pieces of vector artwork in some embodiments. Vector graphics are based on vectors (also called paths), which lead through locations called control points or nodes. Each of these points has a definite position on the x and y axes of the work plane and determines the direction of the path; further, each path may be assigned a stroke colour, shape, thickness, and fill. If a doodle 1002 is added to a template that the user is working on, the width and colour of the lines that make up the selected doodle 1002 may be automatically adjusted to match the line width and colour of any text applied to the template. This is done to more accurately simulate that the pen used to handwrite was also used to add the doodle.

When a doodle 1002 is added to the editable area, the GUI may allow a user to resize, rotate or delete the doodle as desired.

Figure 11:
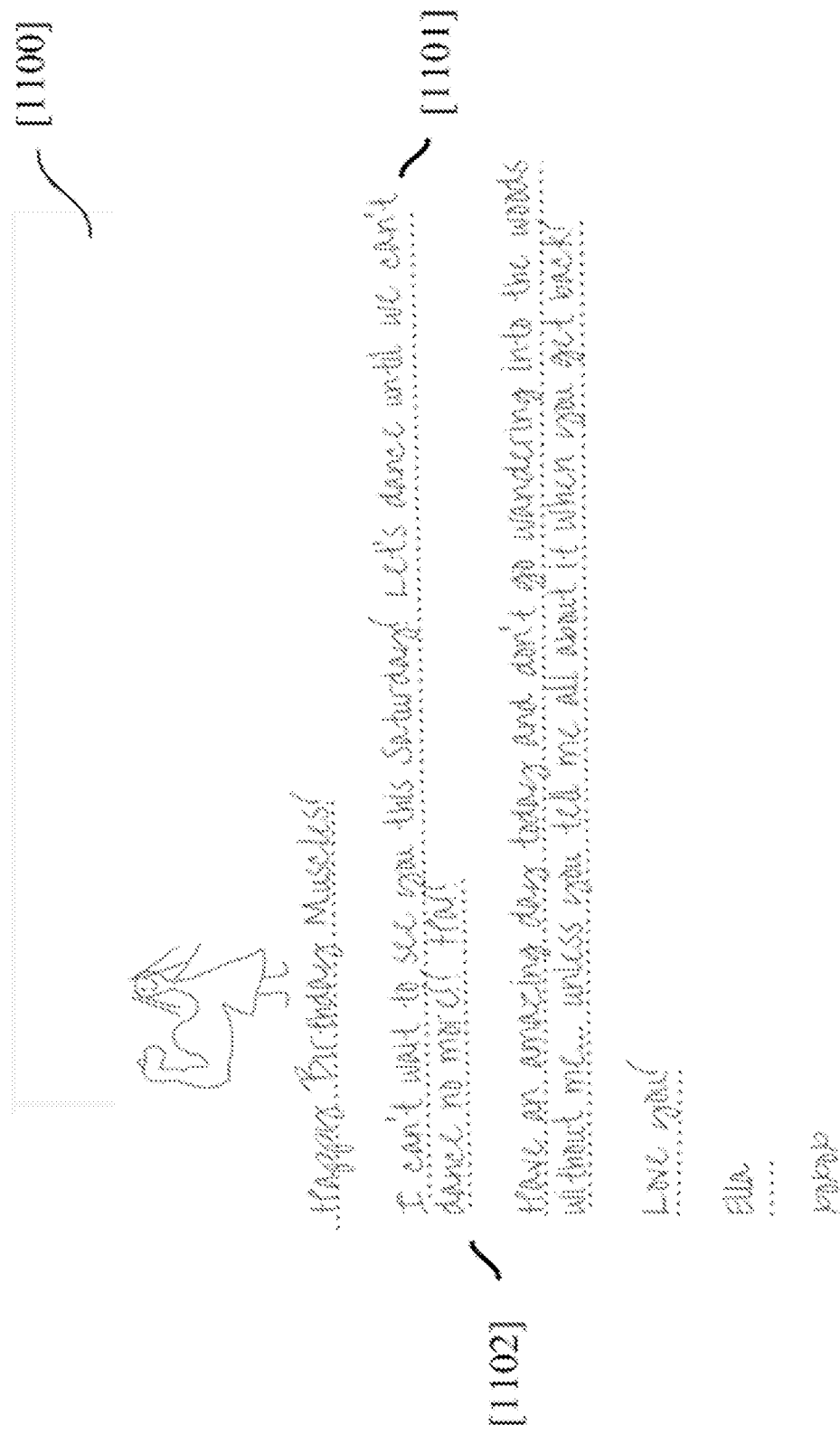
FIG. 11 is an example GUI that may be displayed on a client device of the system of FIG. 1 showing a WYSIWYG screen demonstrating handwriting and line angle variation according to some embodiments.

FIG. 11 illustrates an example of a piece of text 1100 that has been adjusted by the system of FIG. 1. In particular, FIG. 11 illustrates the concept of line adjustment as applied to text at step 411 of FIG. 4 when executing personalised template module 115. As the user types, lines of text 1101 are randomly rotated along a writing axis 1102 by a randomly chosen value. According to some embodiments, the rotation may be between −1.5 to 1.5 degrees from the axis in the direction of writing. In other embodiments where a less neat or steady appearance is desired, lines of text may be rotated from between −3 degrees to 3 degrees or more. In other embodiments where a neat or steady appearance is desired, lines of text may be rotated from between −0.5 degrees to 0.5 degrees or less.

According to some embodiments, if a randomly chosen rotation value for a line differs by more than 0.5 degrees in magnitude from the previous line, the rotation value is clamped to a maximum of 0.5 degrees in the direction of the randomly chosen rotation value. In other words, according to some embodiments, no two adjacent lines will differ in rotation by more than 0.5 degrees. This is done to mimic the tendency for lines of handwritten text to be largely straight, with each subsequent line tending to subtly drift away from being parallel with the last. This restriction on rotation further avoids the jarring appearance of large changes in rotation that would not commonly be seen in handwriting samples. In a preferred embodiment, determined by the study of handwriting samples, the rotation may be clamped to 0.5 degrees change from the previous line. In other embodiments where a less neat or steady appearance is desired, the rotation may be clamped to 1.0 degree or more change from the previous line. In other embodiments where a neat or steady appearance is desired, the rotation may be clamped to 0.25 degree or less change from the previous line.

Figure 12:
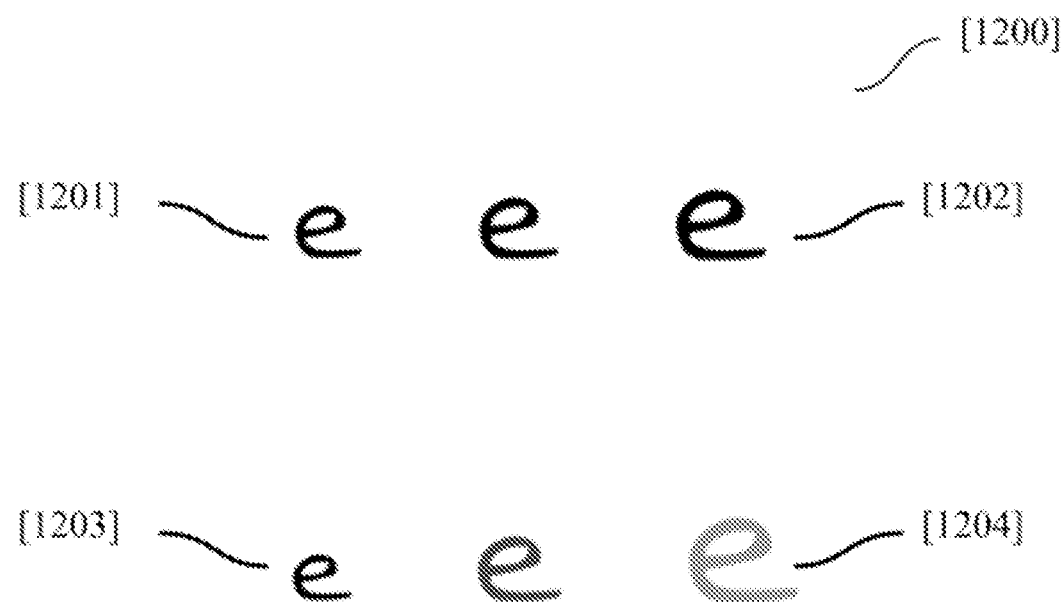
FIG. 12 is an example GUI that may be displayed on a client device of the system of FIG. 1 showing a WYSIWYG screen demonstrating handwriting size variation according to some embodiments.

FIG. 12 illustrates an example of the application of character sizing and shading to written text via execution of personalised template module 115. As described above with reference to FIG. 8, as the user types characters are resized by a randomly chosen value. In the illustrated embodiment, character 1201 has been resized to be 15% smaller than the base size, while character 1202 has been resized to be 15% larger than the base size of the selected handwriting font. According to some embodiments, the sizes of characters may be made 5%, 15% or 25% bigger or smaller than the base font size, for example.

As the sizes of characters are randomly made smaller and larger, the colours of the characters may be changed slightly to represent the varied weight of pen pressure to achieve a smaller or larger character. If a character is larger than the selected size, the colour is lightened to simulate the lower pen pressure used as the writer adjusts for looser curves and broader range of pen movement. If a character is smaller than the selected font size, the colour is darkened to simulate the higher pen pressure used as the writer adjusts for tighter curves and more restricted range of pen movement. For example, character 1203 is darkened, as character 1203 is smaller than the base size. Character 1204 is lightened, as character 1204 is larger than the base size. According to some embodiments, the characters may be lighted or darkened from a base selected by an amount proportional to half the size adjustment value. For example, if the character is 10% larger than the selected font its colour will be lightened by 5%. It follows that if a character is 8% smaller than the selected font, its colour will be darkened by 4%.

Figure 13:
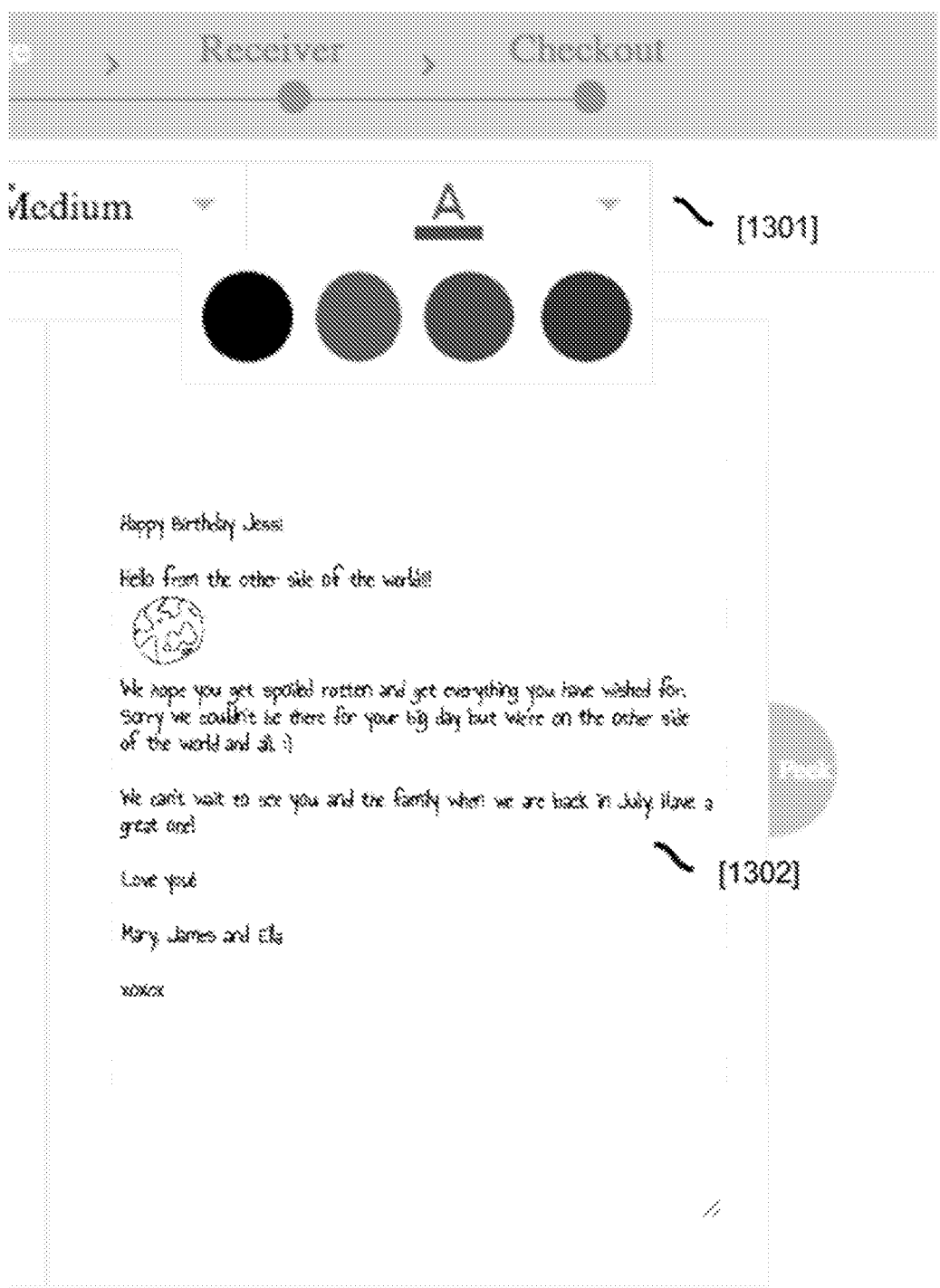
FIG. 13 is an example GUI that may be displayed on a client device of the system of FIG. 1 showing a WYSIWYG screen demonstrating handwriting colour variation according to some embodiments.

FIG. 13 illustrates an example GUI which may be presented to the user on display 1a01 for the user to change the colour of writing and doodles that have been added to the template. A pen colour selector 1301 can be used by the user to select a desired colour. The selected colour is automatically applied to the text and doodles 1302 within the WYSIWYG working environment and within the graphic file 140 that represents the text and doodles. When a user writes a personalised message in the WYSIWYG editor using the GUI, the client application may alter the font and drawings dynamically to create a graphic file 140 that more effectively resembles real handwriting and drawing. The colour selected with colour selector 1301 is applied to both the text and any doodles to mimic the use of the same colour pen. The colour of individual characters, however, remains varied as described above with reference to FIG. 12, to mimic the tendency of handwritten characters to have different pen pressure applied.

Figure 14:
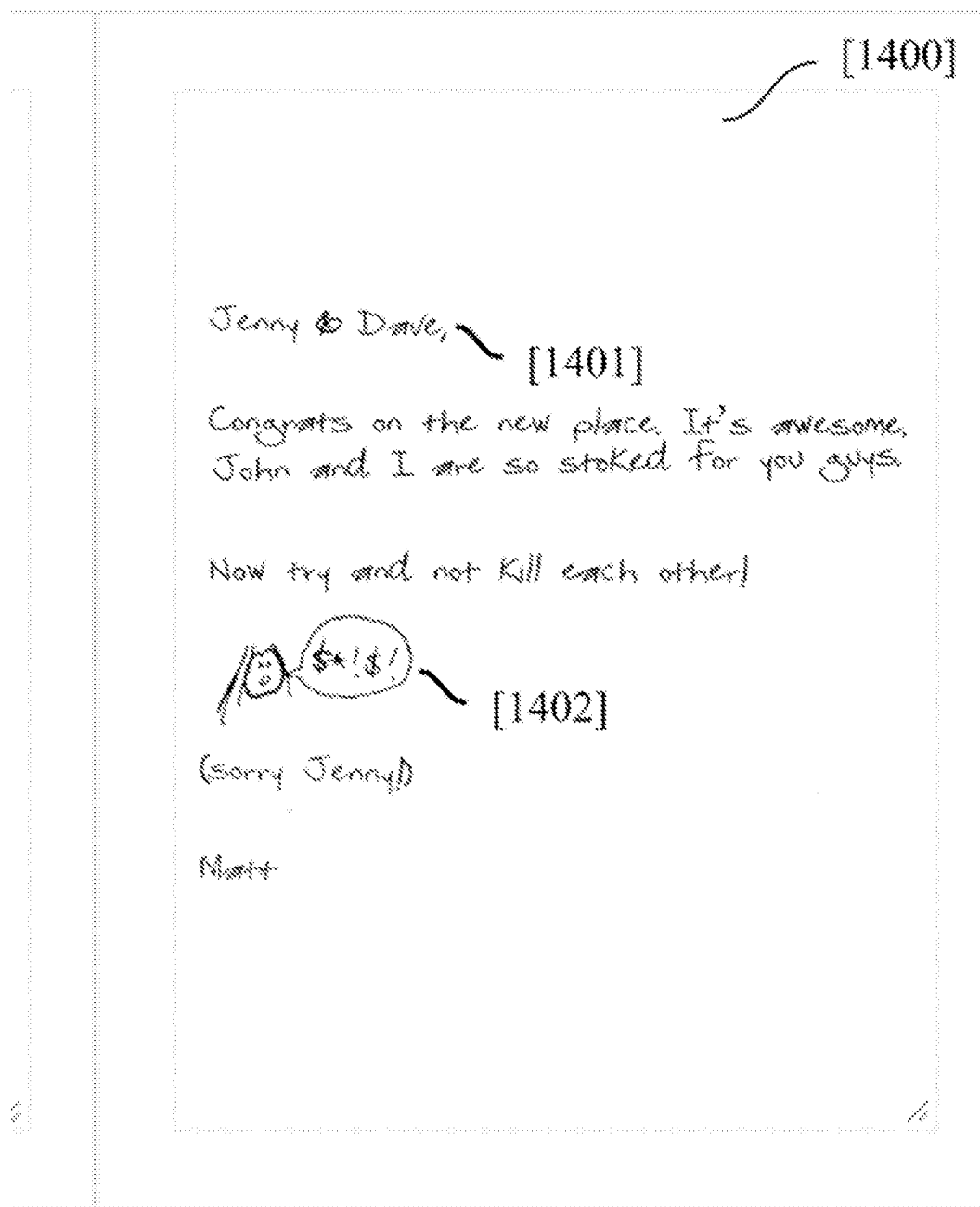
FIG. 14 is an example GUI that may be displayed on a client device of the system of FIG. 1 showing a WYSIWYG screen demonstrating handwriting and a doodle with matching line thickness according to some embodiments.

FIG. 14 illustrates an example GUI 1400 which may be presented to the user on display 1a01 for the user to view the text 1401 and doodles 1402 that they have selected. The user may add doodles 1402 to their design to add greater personalisation. As described above, doodles 1402 are pieces of vector artwork based on vectors (also called paths), which lead through locations called control points or nodes. Each of these points has a definite position on the x and y axes of the work plane and determines the direction of the path; further, each path may be assigned a stroke colour, shape, thickness, and fill. The width and colour of lines of any selected doodles may be automatically adjusted to match the line width and colour of the text 1401. This is done to simulate the doodle 1402 being drawn by the same person and using the same pen as the text 1401 was written with.

Figures 15, 16:
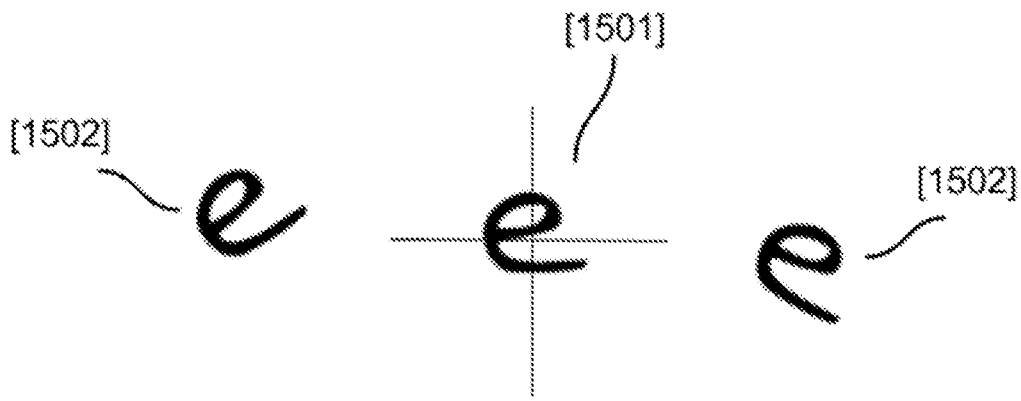
FIG. 15 is an example GUI that may be displayed on a client device of the system of FIG. 1 showing a WYSIWYG screen demonstrating character rotation variation according to some embodiments.
FIG. 16 shows an example output from a handwriting font and an example resulting graphics file output according to some embodiments.

FIG. 15 illustrates an example of character rotation applied to characters of the text added to the template. According to some embodiment, as the user types, the rotation of the characters they type is randomly changed from the standard angle of the character, or unaltered rotation of the character. For example, in the illustrated embodiments, character 1501 is not rotated, and is in its unaltered rotation. Character 1502 has been rotated by 10 degrees counterclockwise, and character 1503 has been rotated by 10 degrees clockwise. In a preferred embodiment, determined by the study of handwriting samples, characters are rotated by a variable between −7 degrees to 7 degrees. In other embodiments where a less neat or steady appearance is desired, characters may be rotated by a variable −10 degrees to 10 degrees. In other embodiments where a neat or steady appearance is desired, characters may be rotated by a variable −3 degrees to 3 degrees. This is done to mimic the tendency of handwritten characters to vary in rotation.

FIG. 16 illustrates the difference between the use of a regular handwriting font 1601 compared to how the same font looks when the variables of the invention (line rotation, character rotation, character size and colour weight randomisation) are applied to the font 1602 as described above with reference to FIGS. 1 to 15.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of creating a graphic file having a personalised message for printing on a stationery product, the method comprising:
   receiving an unformatted message comprising a string of characters;
   receiving a font to apply to the unformatted message;
   applying the font to the unformatted message and arranging the unformatted message into at least one line of characters to produce a formatted message, wherein the characters of the formatted message have a base size and a base colour and wherein the line has a writing axis along which the characters are positioned;
   generating an altered formatted message from the formatted message by:
      automatically and randomly altering the size of at least one of the characters of the formatted message;
      automatically altering the colour of the at least one character based on the altered size of the character, and
      automatically and randomly altering the angle of the writing axis of at least one line of the formatted message; and
   generating a graphic file based on the altered formatted message.

2. The method of claim 1, further comprising:
   displaying on the display device at least one vector graphic option for selection by the user;
   receiving a vector graphic selection from the displayed options;
   automatically altering at least one of the line thickness and line colour of the selected vector graphic, based on the font selection;
   inserting the altered graphic vector into the graphic file.

3. The method of claim 1, further comprising:
   displaying on the display device at least one template artwork option;
   receiving a template artwork selection from the displayed options;
   add the template artwork to the graphic file based on the selected template artwork option.

4. The method of claim 1, further comprising automatically and randomly altering a rotation of at least one of the characters of the formatted message.

5. The method of claim 4, wherein the rotation is altered to be within 10° of an unaltered rotation of the character.

6. The method of claim 1, wherein the size of the at least one character is altered within a limit based on a size of the selected font.

7. The method of claim 6, wherein the size of the at least one character is altered to be between 60% and 140% of the size of the selected font.

8. The method of claim 1, wherein the angle of the writing axis of the at least one line is altered within a limit from an unaltered angle of the writing axis of the at least one line.

9. The method of claim 8, wherein the angle of the writing axis of the at least one line is altered to be within 3° of the unaltered angle of the writing axis of the at least one line.

10. The method of claim 8, wherein the angle of the writing axis of each line is within a limit of the angle of the writing axis of each adjacent line.

11. The method of claim 10, wherein the angle of the writing axis of each line is within 1° of the angle of the writing axis of each adjacent line.

12. The method of claim 1, wherein automatically altering the colour of the at least one character based on the altered size of the character comprises automatically making the change in colour of the character proportional to the change in size of the character.

13. The method of claim 1, further comprising:
   displaying on a display device at least one stroke width option for selection by a user;
   receiving a stroke width selection from the displayed options;
   applying the stroke width selection to the formatted message and any vector graphics.

14. The method of claim 1, further comprising:
   displaying on a display device at least one colour option for selection by a user;
   receiving a colour selection from the displayed options;
   applying the colour selection to the formatted message and any vector graphics before altering the formatted message.

15. The method of claim 1, further comprising:
   displaying on a display device at least one font size option for selection by a user;
   receiving a font size selection from the displayed options;
   applying the font size selection to the formatted message before altering the formatted message.

16. A non-transitory computer-readable medium storing machine-readable instructions, which when executed by a processor, causes the processor to perform a method comprising:
   receiving an unformatted message comprising a string of characters;
   receiving a font to apply to the unformatted message;
   applying the font to the unformatted message and arranging the unformatted message into at least one line of characters to produce a formatted message, wherein the characters of the formatted message have a base size and a base colour and wherein the line has a writing axis along which the characters are positioned;
   generating an altered formatted message from the formatted message by:
      automatically and randomly altering the size of at least one of the characters of the formatted message;
      automatically altering the colour of the at least one character based on the altered size of the character, and
      automatically and randomly altering the angle of the writing axis of at least one line of the formatted message; and
   generating a graphic file based on the altered formatted message.

17. A system for creating a graphic file having a personalised message for printing on a stationery product, the system comprising:
   a client device comprising at least one processor and at least one memory device storing executable code accessible to the processor, the client device being configured to:
      receive an unformatted message comprising a string of characters;
      display on a display device at least one font option for selection by a user;
      receive a font selection from the displayed options;
      apply the font selection to the unformatted message and arrange the unformatted message into at least one line of characters to produce a formatted message, wherein the characters of the formatted message have a base size and a base colour and wherein the line has a writing axis along which the characters are positioned;

generate an altered formatted message from the formatted message by:
- automatically and randomly altering the size of at least one of the characters of the formatted message;
- automatically altering the colour of the at least one character based on the altered size of the character, and
- automatically and randomly altering the angle of the writing axis of at least one line of the formatted message; and a server device, the server being configured to receive the altered formatted message from the client device and generate a graphic file based on the altered formatted message.

18. The system of claim 17, wherein the client device is further configured to:
- display on the display device at least one vector graphic option for selection by the user;
- receive a vector graphic selection from the displayed options; and
- automatically alter at least one of the line thickness and line colour of the selected vector graphic, based on the font selection; and
- wherein the server device is further configured to insert the altered graphic vector into the graphic file.

19. The system of claim 17, wherein the client device is further configured to:
- display on the display device at least one template artwork option; and
- receive a template artwork selection from the displayed options; and
- wherein the server device is further configured to add the template artwork to the graphic file based on the selected template artwork option.

20. The system of claim 17, further comprising a printing device, wherein the server device is configured to automatically communicate the graphic file to the printing device to cause the graphic file to be printed on a stationery item.

* * * * *